United States Patent
Josan et al.

(10) Patent No.: US 11,272,509 B2
(45) Date of Patent: Mar. 8, 2022

(54) UPLINK TIMING ADJUSTMENT IN BEAMFORMED WIRELESS COMMUNICATIONS

(71) Applicant: QUALCOMM Incorporated, San Diego, CA (US)

(72) Inventors: Awlok Singh Josan, San Francisco, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 16/534,617

(22) Filed: Aug. 7, 2019

(65) Prior Publication Data

US 2020/0053712 A1    Feb. 13, 2020

Related U.S. Application Data

(60) Provisional application No. 62/716,642, filed on Aug. 9, 2018.

(51) Int. Cl.
   *H04W 72/04* (2009.01)
   *H04W 24/04* (2009.01)
   *H04L 5/00* (2006.01)

(52) U.S. Cl.
   CPC ......... *H04W 72/046* (2013.01); *H04L 5/0048* (2013.01); *H04W 24/04* (2013.01); *H04W 72/0413* (2013.01)

(58) Field of Classification Search
   CPC ............... H04W 72/046; H04W 24/04; H04W 72/0413; H04W 24/02; H04W 24/10;
   (Continued)

(56) References Cited

U.S. PATENT DOCUMENTS 10,547,374 B1 *  1/2020  Liu ..................... H04W 52/34
10,849,001 B2 * 11/2020  Davydov ............ H04W 64/003
(Continued)

FOREIGN PATENT DOCUMENTS

EP       2408243 A1     1/2012

OTHER PUBLICATIONS

Partial International Search Report—PCT/US2019/045685—ISA/EPO—dated Oct. 22, 2019.
(Continued)

*Primary Examiner* — Brian T O Connor
(74) *Attorney, Agent, or Firm* — Danai Nelisile Mhembere; Holland & Hart LLP

(57) ABSTRACT

Methods, systems, and devices for wireless communications are described that provide for adjustment of an uplink timing at a user equipment (UE) based on switching a beamformed transmission beam used for communications between the UE and a base station. The UE and base station may establish a connection via a first beamformed transmission beam and an uplink timing of the first beamformed transmission beam may be determined. A timing difference between the first beamformed transmission beam and a second beamformed transmission beam may be identified and, in the event that communications are switched from the first beamformed transmission beam to the second beamformed transmission beam, the uplink timing may be adjusted based at least in part on the timing difference. Such uplink timing adjustment may be made autonomously at the UE, and may be made irrespective of a magnitude of the adjustment.

30 Claims, 15 Drawing Sheets

(58) Field of Classification Search
CPC ............. H04W 74/0833; H04W 24/08; H04W 56/0005; H04W 56/0045; H04L 5/0048; H04L 5/0023; H04L 5/0053; H04L 5/0091; H04L 5/0025; H04B 7/0695; H04B 7/088; H04B 7/0689; H04B 7/063; H04B 7/0617; H04B 7/0404; H04B 7/0645; H04B 7/0408

See application file for complete search history.

(56) References Cited

U.S. PATENT DOCUMENTS

| | | | | |
|---|---|---|---|---|
| 11,012,963 | B2* | 5/2021 | Ren | H04W 74/08 |
| 2013/0301619 | A1 | 11/2013 | Singh et al. | |
| 2018/0287860 | A1* | 10/2018 | Xia | H04L 5/0048 |
| 2019/0037429 | A1* | 1/2019 | Davydov | H04L 5/0035 |
| 2019/0053183 | A1* | 2/2019 | Park | H04W 56/0005 |
| 2019/0074879 | A1* | 3/2019 | Furuskog | H04B 7/063 |
| 2019/0132066 | A1* | 5/2019 | Park | H04W 36/0079 |
| 2019/0141693 | A1* | 5/2019 | Guo | H04L 5/0053 |
| 2019/0190582 | A1* | 6/2019 | Guo | H04B 7/0695 |
| 2019/0215048 | A1* | 7/2019 | Cirik | H04B 7/088 |
| 2019/0239212 | A1* | 8/2019 | Wang | H04L 5/0053 |
| 2020/0067615 | A1* | 2/2020 | Ghanbarinejad | H04B 17/309 |
| 2020/0137800 | A1* | 4/2020 | Takahashi | H04W 74/006 |
| 2020/0178279 | A1* | 6/2020 | Frenne | H04W 72/1289 |
| 2020/0205085 | A1* | 6/2020 | Li | H04W 52/241 |
| 2020/0213978 | A1* | 7/2020 | Iyer | H04L 5/0053 |
| 2020/0275523 | A1* | 8/2020 | Zhang | H04W 56/001 |
| 2020/0322893 | A1* | 10/2020 | Yao | H04W 28/18 |
| 2020/0373989 | A1* | 11/2020 | Yan | H04W 52/42 |
| 2020/0374749 | A1* | 11/2020 | Zhang | H04B 7/0695 |
| 2020/0374960 | A1* | 11/2020 | Deenoo | H04W 72/14 |
| 2020/0404638 | A1* | 12/2020 | Deogun | H04L 5/0091 |
| 2020/0413362 | A1* | 12/2020 | Osawa | H04W 72/0413 |
| 2021/0013954 | A1* | 1/2021 | Zhao | H04B 7/0695 |
| 2021/0105767 | A1* | 4/2021 | Guan | H04W 72/0413 |

OTHER PUBLICATIONS

International Search Report and Written Opinion—PCT/US2019/045685—ISA/EPO—dated Dec. 16, 2019.

* cited by examiner

UPLINK TIMING ADJUSTMENT IN BEAMFORMED WIRELESS COMMUNICATIONS

CROSS REFERENCE

The present Application for Patent claims the benefit of U.S. Provisional Patent Application No. 62/716,642 by JOSAN et al., entitled "UPLINK TIMING ADJUSTMENT IN BEAMFORMED WIRELESS COMMUNICATIONS," filed Aug. 9, 2018, assigned to the assignee hereof, and expressly incorporated by reference herein.

BACKGROUND

The following relates generally to wireless communications, and more specifically to uplink timing adjustment in beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs) may use beamformed or precoded signals for transmission and/or reception of wireless communications. For example, a base station may utilize beamformed or precoded transmissions to provide directional transmissions that may mitigate path losses that may be experienced by non-beamformed or non-precoded transmissions which may have a relatively wide beam or omnidirectional transmission pattern. Beamformed transmission beams using such techniques may result in relatively frequent switching of beams relative to non-beamformed transmissions, in order to maintain channel quality as a result of UE movement out of a directional beam path or other interference that may interfere with a particular beam. Efficient techniques for performing such beam switching with relatively little delay and relatively low signaling overhead would be desirable in order to help enhance reliability and efficiency of a network utilizing beamforming.

SUMMARY

The described techniques relate to improved methods, systems, devices, and apparatuses that support uplink timing adjustment in beamformed wireless communications. Various described techniques provide for adjustment of an uplink timing based on switching a beamformed transmission beam used for communications between a UE and a base station. In some cases, the UE and base station may establish a connection via a first beamformed transmission beam, and an uplink timing (e.g., a timing advance (TA)) of the first beamformed transmission beam may be determined. A timing difference between the first beamformed transmission beam and a second beamformed transmission beam may be identified and, in the event that communications are switched from the first beamformed transmission beam to the second beamformed transmission beam, the uplink timing may be adjusted based at least in part on the timing difference. Such uplink timing adjustment may be made autonomously at the UE, and may be made irrespective of a magnitude of the adjustment. In some cases, the uplink timing adjustment may be made based on a magnitude of the timing difference relative to one or more threshold values.

In some cases, the UE and base station may use different transmission beams for different channels (e.g., physical uplink control channel (PUCCH) transmissions and physical uplink shared channel (PUSCH) transmissions), and one of the transmission beams may be switched to a different transmission beam. In such cases, the uplink timing for the channel (e.g., PUCCH) of the switched transmission beam may be adjusted, while the uplink timing for the unswitched channel (e.g., PUSCH) may remain the same. Thus, different uplink channels may have different uplink timings. Further, in cases where different symbols carry different uplink channels, the uplink timing applied by the UE may be different for such different symbols.

A method of wireless communications at a UE is described. The method may include establishing a connection with a base station via a first beamformed transmission beam, determining a timing difference between the first beamformed transmission beam and a second beamformed transmission beam, switching the connection with the base station from the first beamformed transmission beam to the second beamformed transmission beam, and adjusting an uplink timing for communications via the second beamformed transmission beam based on the timing difference.

An apparatus for wireless communications at a UE is described. The apparatus may include a processor, memory in electronic communication with the processor, and instructions stored in the memory. The instructions may be executable by the processor to cause the apparatus to establish a connection with a base station via a first beamformed transmission beam, determine a timing difference between the first beamformed transmission beam and a second beamformed transmission beam, switch the connection with the base station from the first beamformed transmission beam to the second beamformed transmission beam, and adjust an uplink timing for communications via the second beamformed transmission beam based on the timing difference.

Another apparatus for wireless communications at a UE is described. The apparatus may include means for establishing a connection with a base station via a first beamformed transmission beam, determining a timing difference between the first beamformed transmission beam and a second beamformed transmission beam, switching the connection with the base station from the first beamformed transmission beam to the second beamformed transmission beam, and adjusting an uplink timing for communications via the second beamformed transmission beam based on the timing difference.

A non-transitory computer-readable medium storing code for wireless communications at a UE is described. The code may include instructions executable by a processor to establish a connection with a base station via a first beamformed transmission beam, determine a timing difference between the first beamformed transmission beam and a second beamformed transmission beam, switch the connection with the base station from the first beamformed transmission beam to the second beamformed transmission beam, and adjust an uplink timing for communications via the second beamformed transmission beam based on the timing difference.

In some examples of the method, apparatuses, and non-transitory computer-readable medium described herein, the adjusting the uplink timing includes autonomously adjusting the uplink timing prior to an uplink transmission via the second beamformed transmission beam.

In some examples of the method, apparatuses, and non-transitory computer-readable medium described herein, the first beamformed transmission beam and the second beamformed transmission beam may be uplink transmission beams, and where the determining the timing difference may include operations, features, means, or instructions for receiving a first reference signal via a first downlink beam that may be quasi-co-located (QCL) with the first beamformed transmission beam, and a second reference signal via a second downlink beam that may be QCL with the second beamformed transmission beam and determining the timing difference between a first reception time of the first reference signal and a second reception time of the second reference signal.

In some examples of the method, apparatuses, and non-transitory computer-readable medium described herein, the first reference signal and the second reference signal include one or more of a synchronization signal received in a synchronization signal block (SSB), a tracking reference signal (TRS), a channel state information reference signal (CSI-RS), a phase tracking reference signal (PTRS), or any combination thereof.

In some examples of the method, apparatuses, and non-transitory computer-readable medium described herein, the establishing the connection further may include operations, features, means, or instructions for establishing the connection via the first beamformed transmission beam for communications of a first uplink channel and a third beamformed transmission beam for communications of a second uplink channel, and where uplink timing associated with the third beamformed transmission beam may be maintained independently of the switching between the first beamformed transmission beam and the second beamformed transmission beam.

In some examples of the method, apparatuses, and non-transitory computer-readable medium described herein, the first beamformed transmission beam may be quasi-co-located (QCL) with a first synchronization signal block (SSB) transmitted via a first downlink transmission beam and the third beamformed transmission beam may be QCL with a second SSB transmitted via a second downlink transmission beam.

In some examples of the method, apparatuses, and non-transitory computer-readable medium described herein, the second beamformed transmission beam may be used for uplink transmissions in a first set of uplink symbols within an uplink slot, and the third beamformed transmission beam may be used for uplink transmissions in a second set of uplink symbols within the uplink slot, and where uplink timing for the first set of uplink symbols within the uplink slot may be different than uplink timing for the second set of uplink symbols within the uplink slot.

In some examples of the method, apparatuses, and non-transitory computer-readable medium described herein, the first beamformed transmission beam and the second beamformed transmission beam may be used to transmit PUCCH information, and the third beamformed transmission beam may be used to transmit PUSCH information; or the first beamformed transmission beam and the second beamformed transmission beam may be used to transmit PUSCH information, and the third beamformed transmission beam may be used to transmit PUCCH information.

In some examples of the method, apparatuses, and non-transitory computer-readable medium described herein, the uplink timing may be adjusted based on the timing difference irrespective of a magnitude of the timing difference. In some examples of the method, apparatuses, and non-transitory computer-readable medium described herein, the adjusting the uplink timing includes comparing the timing difference to one or more threshold values, and adjusting the uplink timing based at least in part on the comparing. In some examples of the method, apparatuses, and non-transitory computer-readable medium described herein, the first beamformed transmission beam may be a line-of-sight (LOS) beam and the second beamformed transmission beam may be a non-LOS beam.

DETAILED DESCRIPTION

Figure 1:
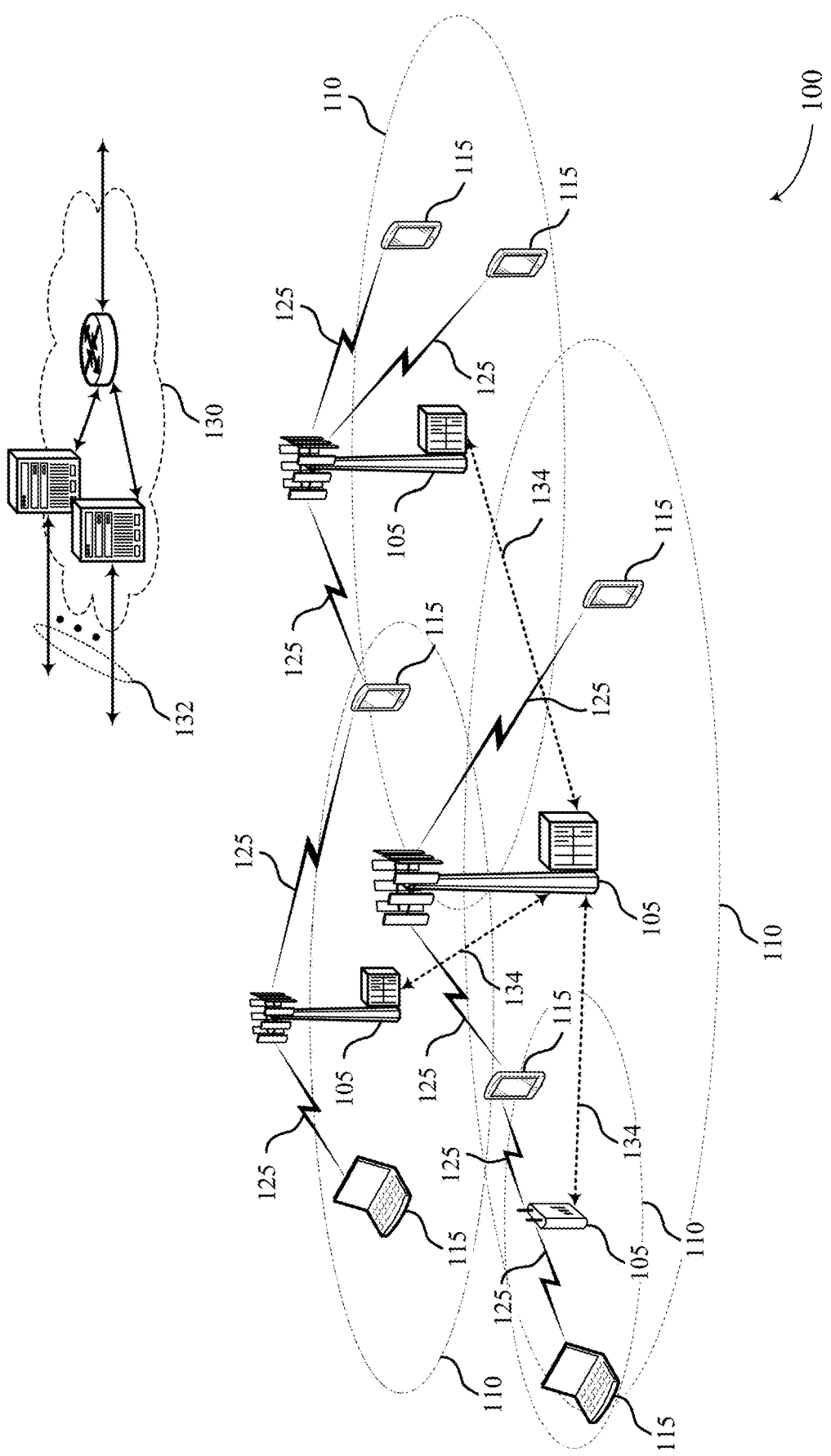
FIG. 1 illustrates an example of a system for wireless communications that supports aspects of the present disclosure.

Various aspects of the present disclosure relate to methods, systems, devices, and apparatuses that support uplink timing adjustment in beamformed wireless communications. Described techniques provide for adjustment of an uplink timing when switching transmission beams. In some cases, a user equipment (UE) and a base station may establish a connection via a first beamformed transmission beam and an uplink timing (e.g., a timing advance (TA)) of the first beamformed transmission beam may be determined. A timing difference between the first beamformed transmission beam and a second beamformed transmission beam may be identified and, when communications are switched from the first beamformed transmission beam to the second beamformed transmission beam, the uplink timing may be adjusted based on the timing difference. Such uplink timing adjustment may be made autonomously at the UE, and may be made irrespective of a magnitude of the adjustment, thus providing efficient uplink timing (e.g., TA) adjustments with relatively little signaling overhead.

Some techniques provided herein also allow for multiple uplink timings to be applied at a UE for different uplink channels. For example, the UE and base station may use a first transmission beam for a first uplink channel (e.g., a physical uplink control channel (PUCCH)), and a second transmission beam for a second uplink channel (e.g., a physical uplink shared channel (PUSCH)). The second transmission beam may be switched and its associated uplink timing may be adjusted, while the first transmission beam and associated uplink timing may remain unchanged. Thus, different uplink channels may have different uplink timings. Further, in cases where different symbols (e.g., different orthogonal division multiplexing (OFDM) symbols) within a transmission slot carry different uplink channels, the uplink timing applied by the UE may be different for such different symbols.

In some cases, the first beamformed transmission beam and the second beamformed transmission beam may be uplink transmission beams. The timing difference between the first and second beamformed transmission beams may be determined based on a difference in reception time of a first reference signal received at the UE via a first downlink beam that is quasi-co-located (QCL) with the first beamformed transmission beam and a second reference signal via a second downlink beam that is QCL with the second beamformed transmission beam. The first reference signal and the second reference signal may include a synchronization signal associated with a synchronization signal block (SSB), a tracking reference signal (TRS), a channel state information reference signal (CSI-RS), a phase tracking reference signal (PTRS), of any combinations thereof.

In some cases, UE timing adjustment upon a beam switch may be based on one or more threshold values associated with timing differences between the beams. For example, when performing a beam switch, a UE may determine the timing difference (e.g., $T_d$) between a new beam and a current beam, compare the timing difference to a threshold value (e.g., TH1), and make one-shot a timing adjustment if the timing difference exceeds the threshold value (e.g., TH1<$T_d$). In some cases, a UE may compare the timing difference to two thresholds (e.g., TH1 and TH2, where TH1<TH2), and if the magnitude of the difference is between the two thresholds (e.g., TH1<$T_d$<TH2) the UE may adjust its uplink timing based on the difference. The threshold values in such cases may be indicated by the network or the UE may decide them on its own accord, in some examples. If the magnitude of the difference exceeds the second threshold (e.g., $T_d$>TH2), then the UE may perform a different procedure. For instance, the UE may go through a random access channel (RACH) procedure again when the magnitude of the difference exceeds the second threshold.

Such autonomous uplink timing adjustments may allow UEs to efficiently and quickly adjust uplink timings for uplink transmissions in the event of a beam change. In some existing deployments, a timing advance may be updated based on a TA command provided by a base station to a UE, or adjustments may be made autonomously at the UE within certain predefined bounds. However, in the event of a beam switch, a TA value may be significantly different between two beams. Such a difference may be due to, for example, a first beam having a line of sight (LOS) propagation path and a second beam having a non-LOS path (e.g., the second beam path may reflect off of a building). Thus, the difference in the total distance between the two paths may result in an increased propagation delay that exceeds predefined bounds for adjusting a TA. Accordingly, techniques such as discussed herein may allow for autonomous update of an uplink timing (e.g., a TA) without a TA command signaled from the base station and that provides the TA may be adjusted, in some cases, irrespective of the magnitude of the change in the uplink timing value. Further, techniques discussed herein may allow a UE to have different uplink timings for different uplink channels, which may allow the UE to use different transmission beams for different uplink channels and switch the different transmission beams independently according to current channel conditions.

Aspects of the disclosure are initially described in the context of a wireless communications system. Aspects of the disclosure are further illustrated by and described with reference to apparatus diagrams, system diagrams, and flowcharts that relate to uplink timing adjustment in beamformed wireless communications.

FIG. 1 illustrates an example of a wireless communications system 100 that supports aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). In some cases, backhaul links 134 may be beamformed wireless links between different base stations 105 (e.g., in an integrated access and backhaul (IAB) network), and aspects of the present disclosure may be applied to wireless links between base stations 105.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300

MHz to 300 GHz. Generally, the region from 300 MHz to 3 GHz is known as the ultra-high frequency (UHF) region or decimeter band, since the wavelengths range from approximately one meter to one decimeter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, base stations 105 and UEs 115 may use beamformed transmission beams for communication, and UEs 115 may perform adjustment of an uplink timing when switching transmission beams. In some cases, a UE 115 and a base station 105 may establish a connection via a first beamformed transmission beam, and a timing difference between the first beamformed transmission beam and a second beamformed transmission beam may be identified. When communications are switched from the first beamformed transmission beam to the second beamformed transmission beam, the uplink timing may be adjusted based on the timing difference. In some cases, such uplink timing adjustment may be made autonomously at the UE 115, and may be made irrespective of a magnitude of the adjustment, thus providing efficient uplink timing adjustments with relatively little signaling overhead. In some cases, the uplink timing adjustment may be made based on a magnitude of the timing difference relative to one or more threshold values.

Figure 2:
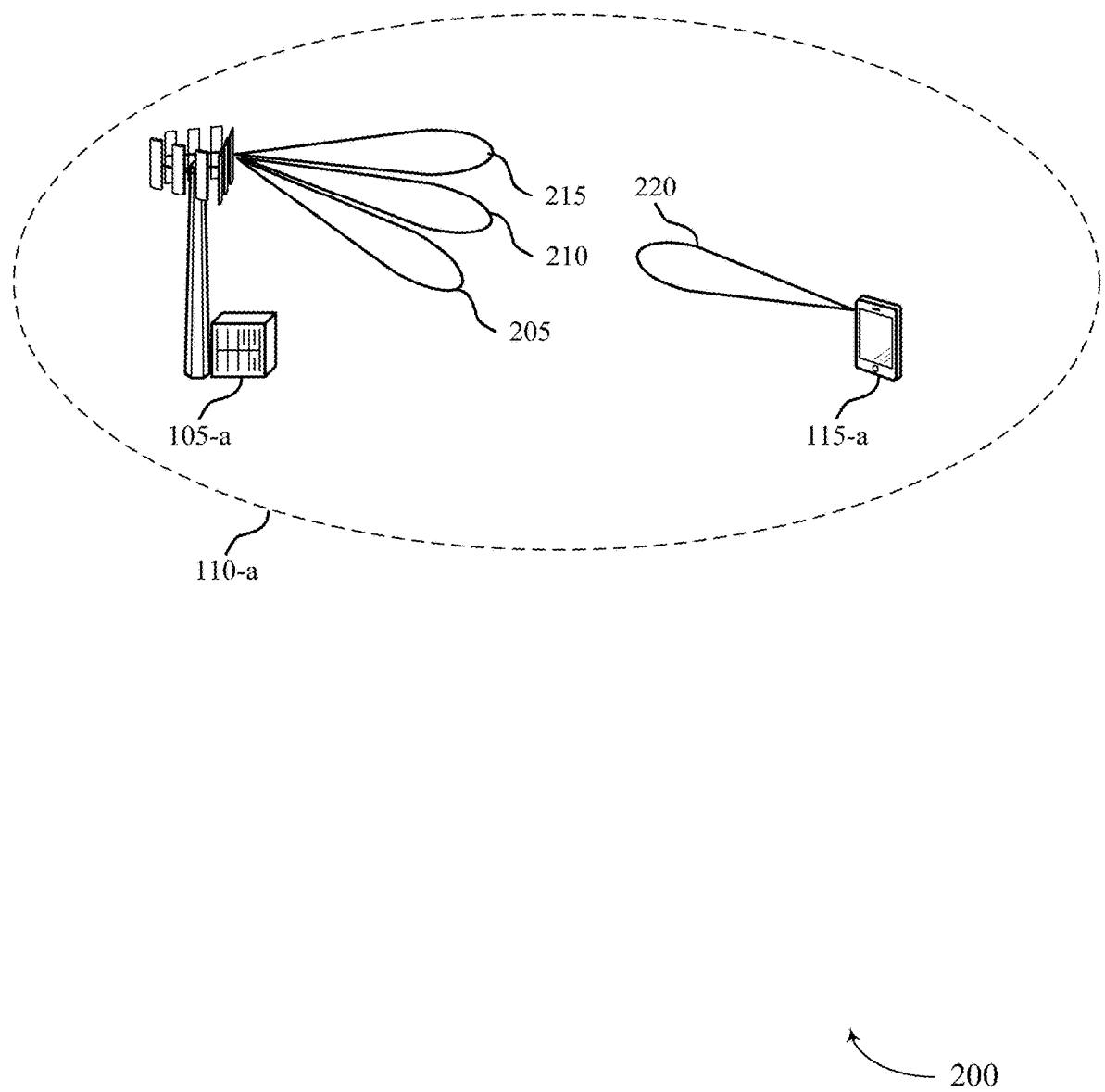
FIG. 2 illustrates an example of a portion of a wireless communications system that supports aspects of the present disclosure.

FIG. 2 illustrates an example of a wireless communications system 200 that supports aspects of the present disclosure. In some examples, wireless communications system 200 may implement aspects of wireless communications system 100. The wireless communications system 200 may include base station 105-a and UE 115-a, which may be examples of a base station 105 and a UE 115, as described with reference to FIG. 1.

Base station 105-a may provide network coverage for geographic area 110-a. Base station 105-a and UE 115-a may communicate using beamformed or directional transmissions, and non-beamformed transmissions. For example, in downlink communications, base station 105-a may transmit downlink transmissions to UE 115-a using a beamformed downlink transmission beam 210, which may be one of a number of downlink transmission beams used by the base station 105-a, such as downlink transmission beams 215 and 215. The UE 115-a may transmit uplink transmissions to the base station 105-a using a beamformed uplink transmission beam 220.

In order to ensure that signals from UE 115-a arrive at the base station 105-a at expected transmission boundaries (i.e., such that uplink signals from multiple UEs 115 arrive at or near the same time at a frame or symbol boundary), the UE 115-a determines an uplink timing and uses the uplink timing to adjust uplink transmission timing. The uplink timing accounts for the distance between the UE 115-a and the base station 105-a. In traditional systems, uplink timing (e.g., TA) adjustments may be performed responsive to an uplink timing command (e.g., a TA command) from the base station 105-a, or may be performed autonomously based on downlink signals (e.g., based on one or more reference signals transmitted by the base station 105-a). However, such autonomous adjustments have rates and values that are bounded based on a predetermined maximum value. Further, in some cases, the UE 115-a and the base station 105-a may initiate a beam switch, which may be initiated at either the UE 115-a or the base station 105-a. In cases where the new beam has significantly different timing, the uplink timing for uplink transmissions of the UE 115-a may need to be adjusted. The change in uplink timing may result from the initial beam having a LOS propagation path while the other beam may be reflected off a surface, resulting in significantly different path lengths.

Figure 3:
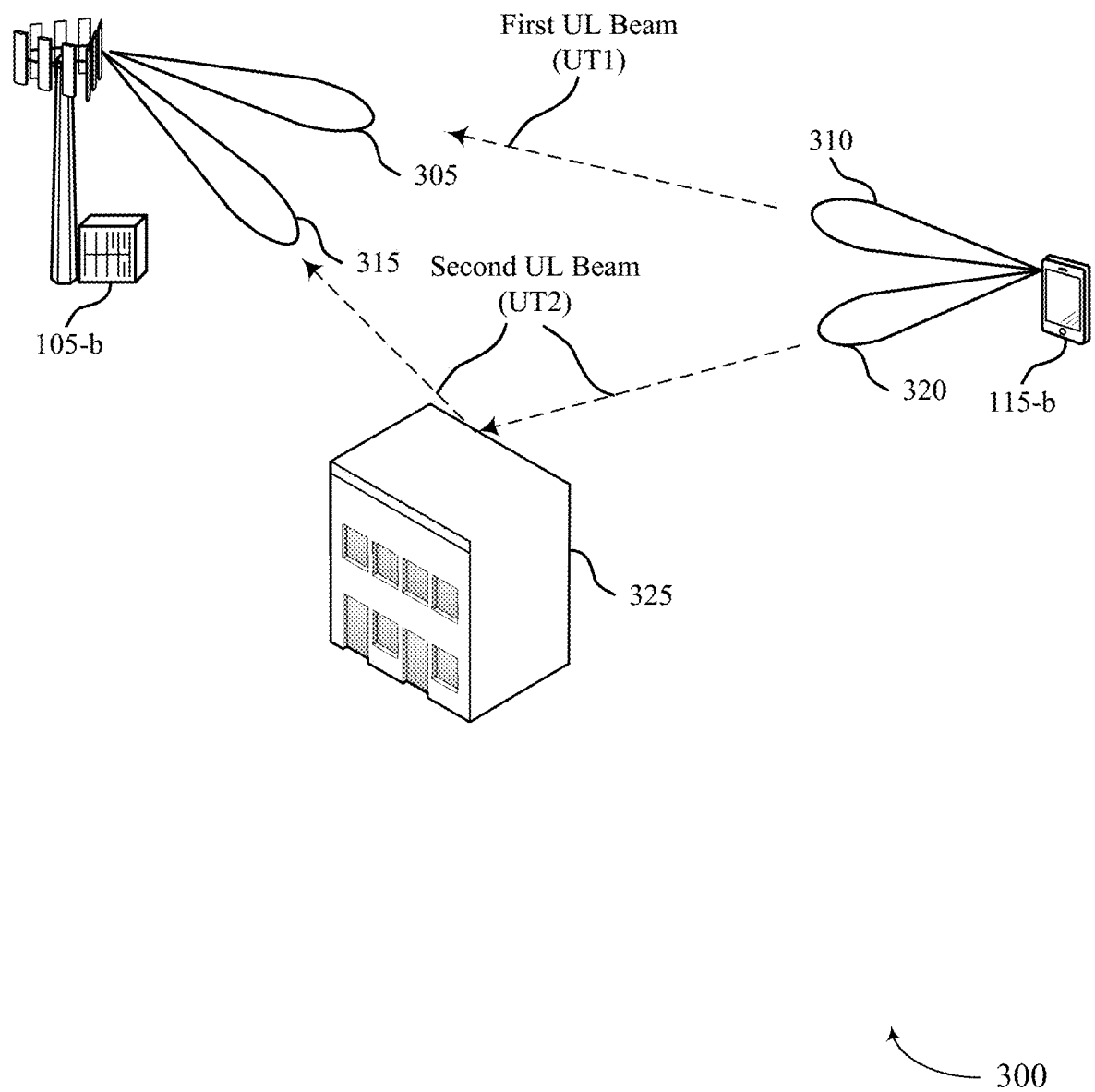
FIG. 3 illustrates another example of a portion of a wireless communications system that supports aspects of the present disclosure.
Figure 4:
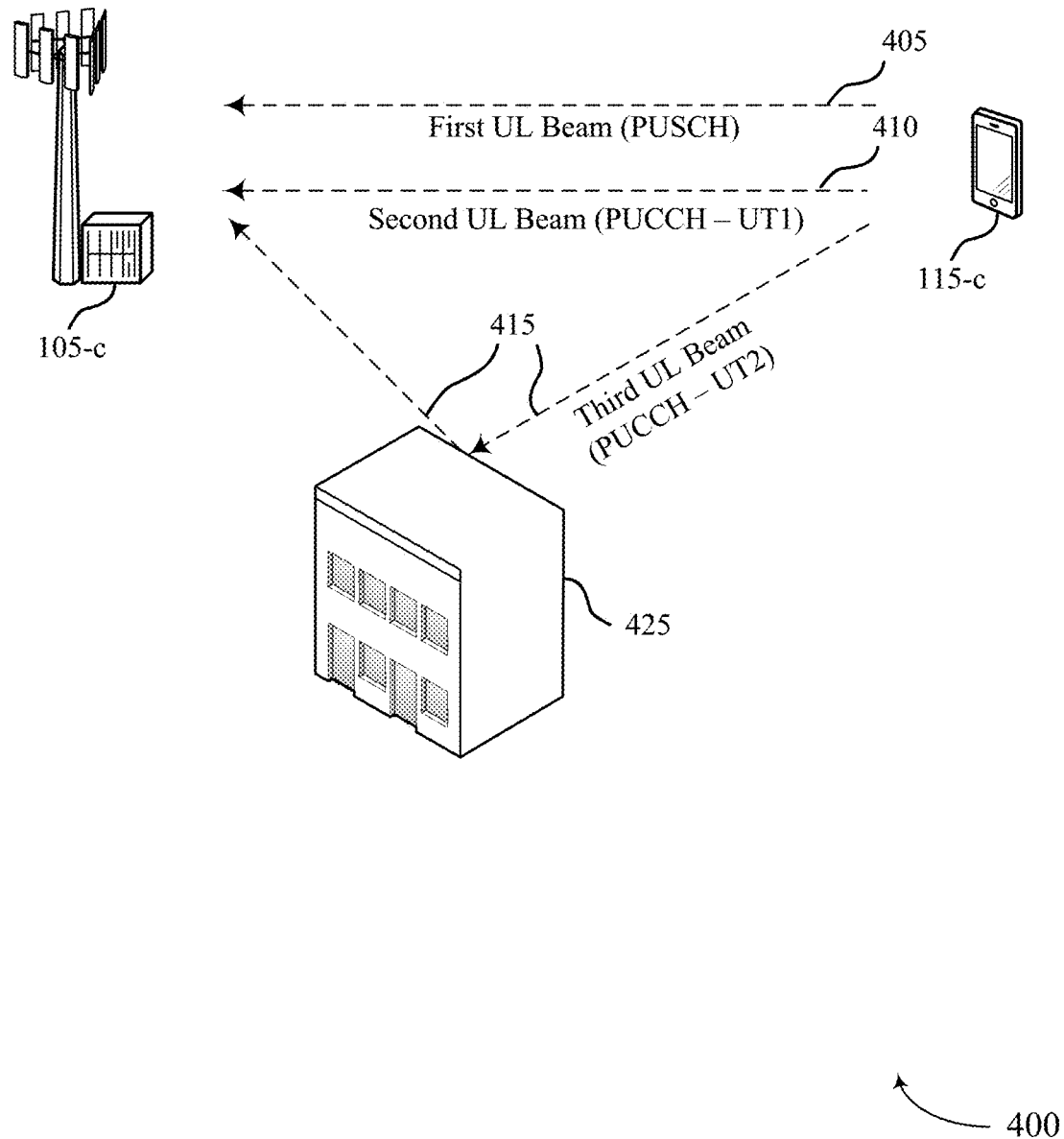
FIG. 4 illustrates another example of a portion of a wireless communications system that supports aspects of the present disclosure.

For example, as indicated above, in some cases the base station 105-a may transmit SSBs via different downlink transmission beams, and different uplink transmission beams of the UE 115-a may be QCL with different downlink transmission beams. In some cases, each corresponding pair of transmit beams may be referred to as a beam pair link (BPL), and the UE 115-a and the base station 105-a may configure two or more BPLs and switching between configured BPLs may be performed based on channel conditions. In some cases, beamformed transmissions may switch BPLs relatively quickly, such as in cases where the UE 115-a is moving relative to the base station 105-a, or in cases where temporary interference sources may impact a transmission beam (e.g., a user of UE 115-a may move their hand such that an antenna panel at the UE 115-a is blocked, or a vehicle or piece of machinery may move into a beam path of a transmission beam). In many cases, different transmission beams that may be used for beam switching may be LOS beams and have a same or similar uplink timing. However, in some cases, beam paths may be sufficiently different (e.g., for non-LOS beams) that different uplink timings may be used when switching between transmission beams, in accordance with various techniques discussed herein. FIGS. 3 and 4 illustrate two examples of beam switching that may prompt an uplink timing adjustment at UE 115-a when performing a beam switch.

FIG. 3 illustrates an example of a wireless communications system 300 that supports aspects of the present disclosure. In some examples, wireless communications system 300 may implement aspects of wireless communications system 100 or 200. The wireless communications system 300 may include base station 105b and UE 115b, which may be examples of a base station 105 and a UE 115, as described herein.

Base station 105b and UE 115b may initially communicate using beamformed or directional transmissions via first downlink beam 305 and first uplink beam 310. Uplink transmissions may be transmitted via the first uplink beam using a first uplink timing (UT1). It may be determined that a beam switch is to be performed (e.g., based on channel conditions of the first downlink beam 305 and first uplink beam 310), and the UE 115b and base station 105b may switch to use second downlink beam 315 and second uplink beam 320. For example, a vehicle or piece of equipment may move to be located between the UE 115b and the base station 105b and block the first downlink beam 305 and first uplink beam 310. In this example, the second uplink beam 320 may have a non-LOS path to the base station 105b, due to being reflected off of building 325. In such a case, the UE 115b may perform an adjustment of the uplink timing to a second uplink timing (UT2) for uplink transmissions via the second uplink beam 320.

In some cases, the UE 115b and base station 105b may have established the different pairs of uplink and downlink beams as BPLs. In advance of the beam switch, the UE 115b may determine a timing difference between the receipt of one or more reference signals that are transmitted from the base station via the first downlink beam 305 and the second downlink beam 315. This difference in timing of the reference signals may be assumed to be a result of the difference in propagation delay of the two transmission beams, and be used to adjust the uplink timing value for uplink transmissions via the second uplink transmission beam 320. For example, the UE 115*b* may receive an uplink timing command (e.g., TA command) from the base station 105*b* via the first downlink transmission beam 305, and may perform an uplink timing procedure to determine the first uplink timing (e.g., TA). The UE 115*b* may then measure a difference in arrival times of one or more reference signals transmitted via the first downlink transmission beam 305 and the second downlink transmission beam 315, and use the difference to determine an uplink timing adjustment for uplink transmissions using the second uplink transmission beam 315. The reference signals used to determine the timing difference between transmission beams may include a synchronization signal associated with a synchronization signal block (SSB), a tracking reference signal (TRS), a channel state information reference signal (CSI-RS), a phase tracking reference signal (PTRS), or any combinations thereof.

Thus, when transmission beams are switched such that uplink transmissions are switched from the first uplink transmission beam 310 to the second uplink transmission beam 320, the uplink timing may be autonomously adjusted at the UE 115*b*. In some cases, the uplink timing may be adjusted based on the measured timing difference of the two downlink transmission beams 305 and 315, and the adjustment may be made irrespective of a magnitude of the timing difference. Thus, efficient uplink timing adjustments with no or little signaling overhead may be made at the UE 115*b* when beams are switched.

In some cases, the UE 115*b* may make a timing adjustment based on one or more threshold values associated with the measured timing difference of the two downlink transmission beams 305 and 315. For example, when transmission beams are switched, the UE 115*b* may determine the timing difference (e.g., $T_d$) between the receipt of one or more reference signals that are transmitted from the base station 105*b* via the first downlink beam 305 and the second downlink beam 315, compare the timing difference to a first threshold value (e.g., TH1), and make a timing adjustment if a magnitude of the timing difference exceeds the first threshold value (e.g., TH1<$|T_d|$). In some cases, the UE 115*b* may compare the timing difference to both the first threshold value and a second threshold value (e.g., TH1 and TH2, where TH1<TH2), and if the magnitude of the timing difference is between the two thresholds (e.g., TH1<$|T_d|$<TH2) the UE 115*b* may adjust its uplink timing based on the difference. The threshold values in such cases may be indicated by the network or the UE 115*b* may decide them on its own accord. In some cases, the first threshold value may be associated with a relatively small timing change that may be within bounds of a cyclic prefix used for uplink transmissions. Additionally or alternatively, the second threshold value may be associated with a relatively large timing change such that the measured timing difference may be unreliable and a new uplink timing (e.g., TA) procedure should be performed to obtain the uplink timing (e.g., TA) rather than an adjustment based on the measured timing difference.

FIG. 4 illustrates an example of a wireless communications system 300 that supports aspects of the present disclosure. In some examples, wireless communications system 300 may implement aspects of wireless communications system 100, 200, or 300. The wireless communications system 400 may include base station 105*c* and UE 115-*c*, which may be examples of a base station 105 and a UE 115, as described herein.

Similarly as discussed above, base station 105*c* and UE 115*c* may use beamformed transmissions for communications. In this example, different uplink channels and different downlink channels may use different transmission beams, and uplink timing adjustments for uplink channels are discussed. Initially, a first uplink beam 405 may be used to transmit PUSCH transmissions, and a second uplink beam 410 may be used to transmit PUCCH transmissions. Each of the PUSCH and PUCCH transmissions may use a first uplink timing (UT1), in this example. Additionally, a third uplink beam 415 may be configured, and the UE 115-*a* may determine an uplink timing adjustment to be applied to the third uplink beam 415 based on downlink reference signals that are QCL with each of the second uplink beam 410 and third uplink beam 415. For example, physical downlink shared channel (PDSCH) and PUSCH may be QCL with SSB0, and physical downlink control channel (PDCCH) and PUCCH may be QCL with SSB2. In the event that the SSB for PDCCH changes, the UE 115*c* may adjust the corresponding UL PDCCH channel to have a new uplink timing based on a timing difference between reference signals transmitted via the corresponding SSBs.

In this example, the third uplink beam 415 may have a non-LOS path to the base station 105-*c*, due to being reflected off of building 425. In such a case, the UE 115*c* may perform an adjustment of the uplink timing to a second uplink timing (UT2) for uplink transmissions via the third uplink beam 415. The uplink timing for the first uplink beam 405 may remain unchanged. Thus, in this example, the UE 115*c* may have different uplink timings for different uplink channels. Additionally, in cases where different uplink channels are allocated resources in different uplink symbols within a transmission slot, the UE 115-*c* may use different uplink timings for different symbols within a transmission slot.

Figure 5:
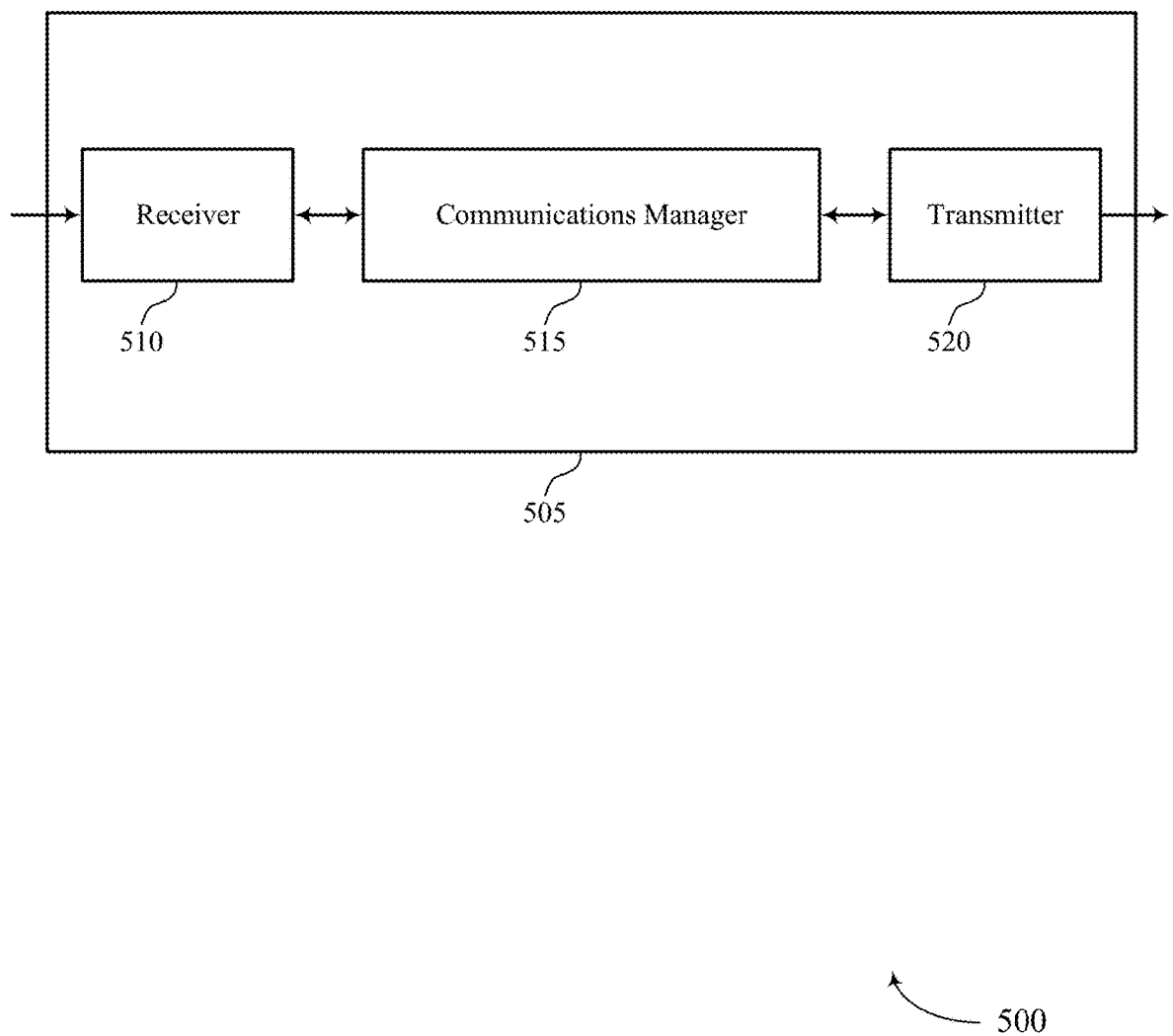
FIGS. 5 and 6 show block diagrams of devices that support aspects of the present disclosure.

FIG. 5 shows a block diagram 500 of a device 505 that supports aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink timing adjustment in beamformed wireless communications). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a connection with a base station via a first beamformed transmission beam, determine a timing difference between the first beamformed transmission beam and a second beamformed transmission beam, adjust an uplink timing for communications via the second beamformed transmission beam based on the timing difference, and switch the connection with the base station from the first beamformed transmission beam to the second beamformed transmission beam. The actions performed by the communications manager 15 as described herein may be implemented to realize one or more potential advantages. One implementation may allow a UE 115 to improve quality and reliability of service by avoiding an impact to demodulation performance when UE 115 switches beams. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
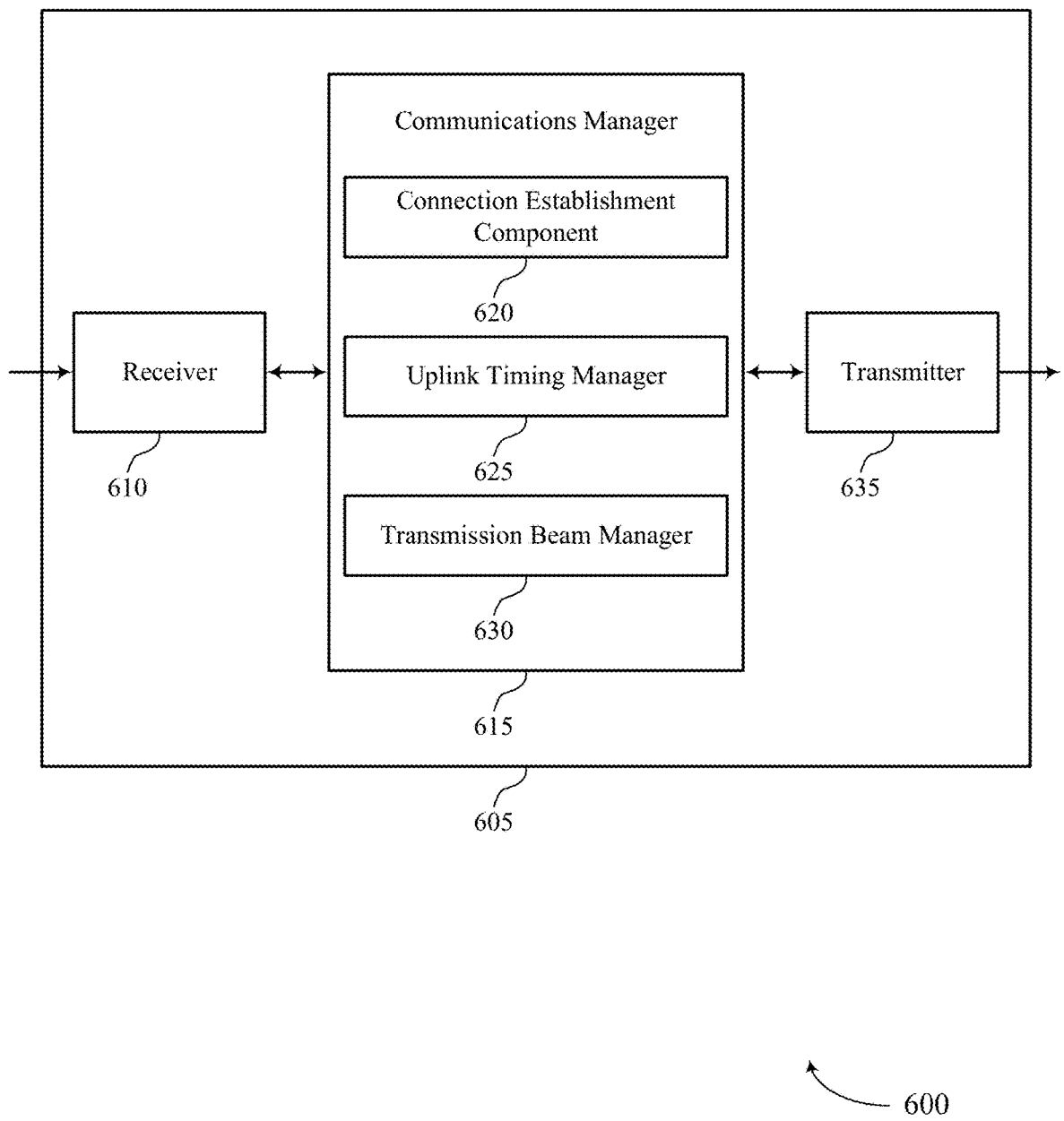

FIG. 6 shows a block diagram 600 of a device 605 that supports aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink timing adjustment in beamformed wireless communications). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection establishment component 620, an uplink timing manager 625, and a transmission beam manager 630. The communications manager 615 may be an example of aspects of the communications manager 810 described herein.

The connection establishment component 620 may establish a connection with a base station via a first beamformed transmission beam.

The uplink timing manager 625 may determine a timing difference between the first beamformed transmission beam and a second beamformed transmission beam and adjust an uplink timing for communications via the second beamformed transmission beam based on the timing difference.

The transmission beam manager 630 may switch the connection with the base station from the first beamformed transmission beam to the second beamformed transmission beam.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
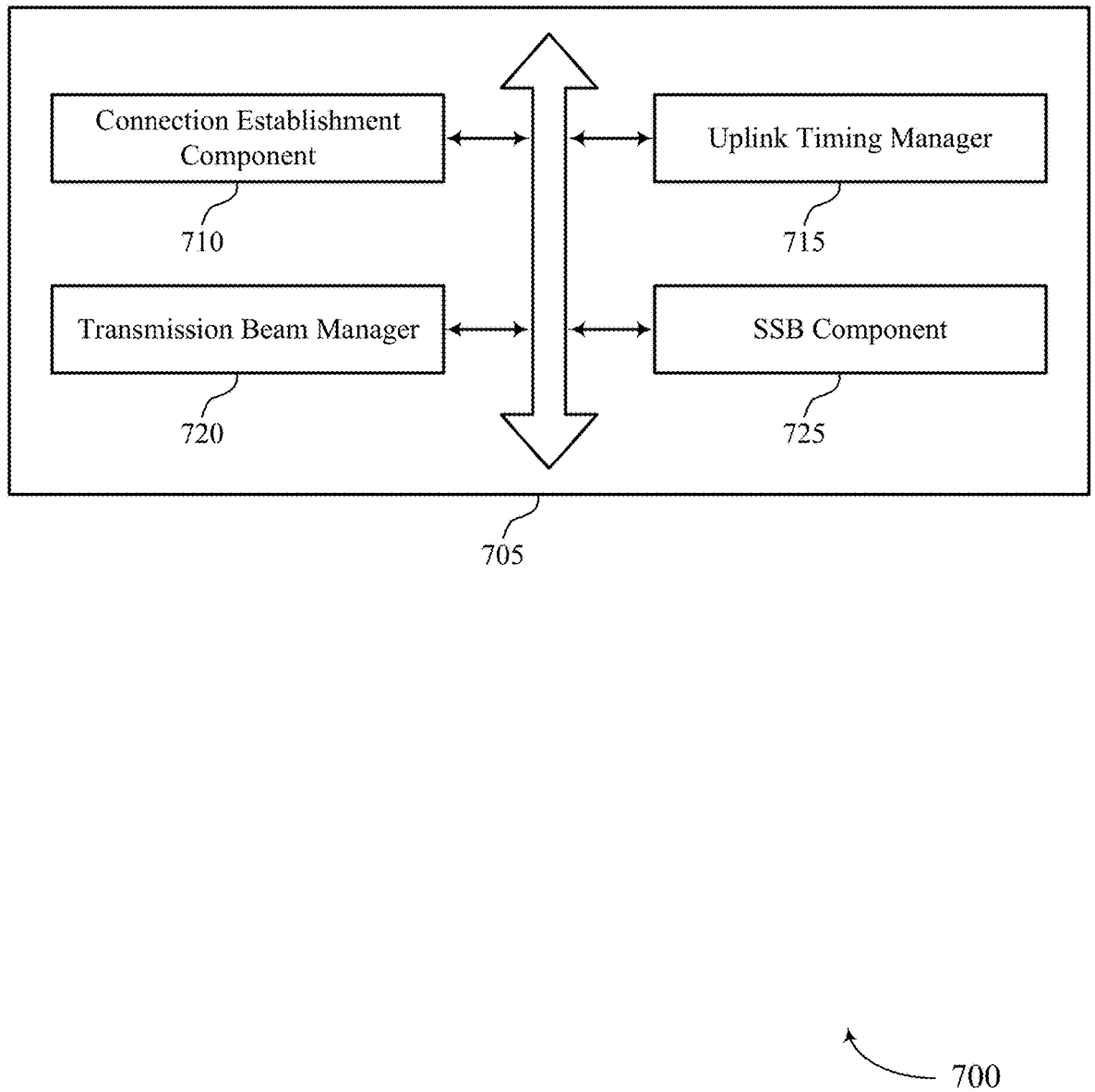
FIG. 7 shows a block diagram of a communications manager that supports aspects of the present disclosure.

FIG. 7 shows a block diagram 700 of a communications manager 705 that supports aspects of the present disclosure. The communications manager 705 may be an example of aspects of a communications manager 515, a communications manager 615, or a communications manager 810 described herein. The communications manager 705 may include a connection establishment component 710, an uplink timing manager 715, a transmission beam manager 720, and an SSB component 725. Each of these modules may communicate, directly or indirectly, with one another (e.g., via one or more buses).

The connection establishment component 710 may establish a connection with a base station via a first beamformed transmission beam. In some examples, two or more BPLs may be established, and the UE and base station may switch between established BPLs without performing a separate radio resource control (RRC) connection establishment.

The uplink timing manager 715 may determine a timing difference between the first beamformed transmission beam and a second beamformed transmission beam. In some examples, the uplink timing manager 715 may adjust an uplink timing for communications via the second beamformed transmission beam based on the timing difference.

In some examples, the uplink timing manager 715 may receive a first reference signal via a first downlink beam that is quasi-co-located (QCL) with the first beamformed transmission beam, and a second reference signal via a second downlink beam that is QCL with the second beamformed transmission beam. In some examples, the uplink timing manager 715 may determine the timing difference between a first reception time of the first reference signal and a second reception time of the second reference signal. In some cases, the adjusting the uplink timing includes autonomously adjusting the uplink timing prior to an uplink transmission via the second beamformed transmission beam. In some cases, the first reference signal and the second reference signal include one or more of a synchronization signal received in a synchronization signal block (SSB), a tracking reference signal (TRS), a channel state information reference signal (CSI-RS), a phase tracking reference signal (PTRS), of any combination thereof. In some cases, the uplink timing is adjusted based on the timing difference irrespective of a magnitude of the timing difference.

The transmission beam manager 720 may switch the connection with the base station from the first beamformed transmission beam to the second beamformed transmission beam. In some examples, the transmission beam manager 720 may establish the connection via the first beamformed transmission beam for communications of a first uplink channel and a third beamformed transmission beam for communications of a second uplink channel, and where uplink timing associated with the third beamformed transmission beam is maintained independently of the switching between the first beamformed transmission beam and the second beamformed transmission beam. In some cases, the second beamformed transmission beam is used for uplink transmissions in a first set of uplink symbols within an uplink slot, and the third beamformed transmission beam is used for uplink transmissions in a second set of uplink symbols within the uplink slot, and where uplink timing for the first set of uplink symbols within the uplink slot is different than uplink timing for the second set of uplink symbols within the uplink slot. In some cases, the first beamformed transmission beam and the second beamformed transmission beam are used to transmit PUCCH information, and the third beamformed transmission beam is used to transmit PUSCH information. In other cases, the first beamformed transmission beam and the second beamformed transmission beam are used to transmit PUSCH information, and the third beamformed transmission beam is used to transmit PUCCH information. In some cases, the first beamformed transmission beam is a line-of-sight (LOS) beam and the second beamformed transmission beam is a non-LOS beam.

The SSB component 725 may monitor one or more SSBs transmitted by a base station. In some cases, the first beamformed transmission beam is quasi-co-located (QCL) with a first synchronization signal block (SSB) transmitted via a first downlink transmission beam and the third beamformed transmission beam is QCL with a second SSB transmitted via a second downlink transmission beam.

Figure 8:
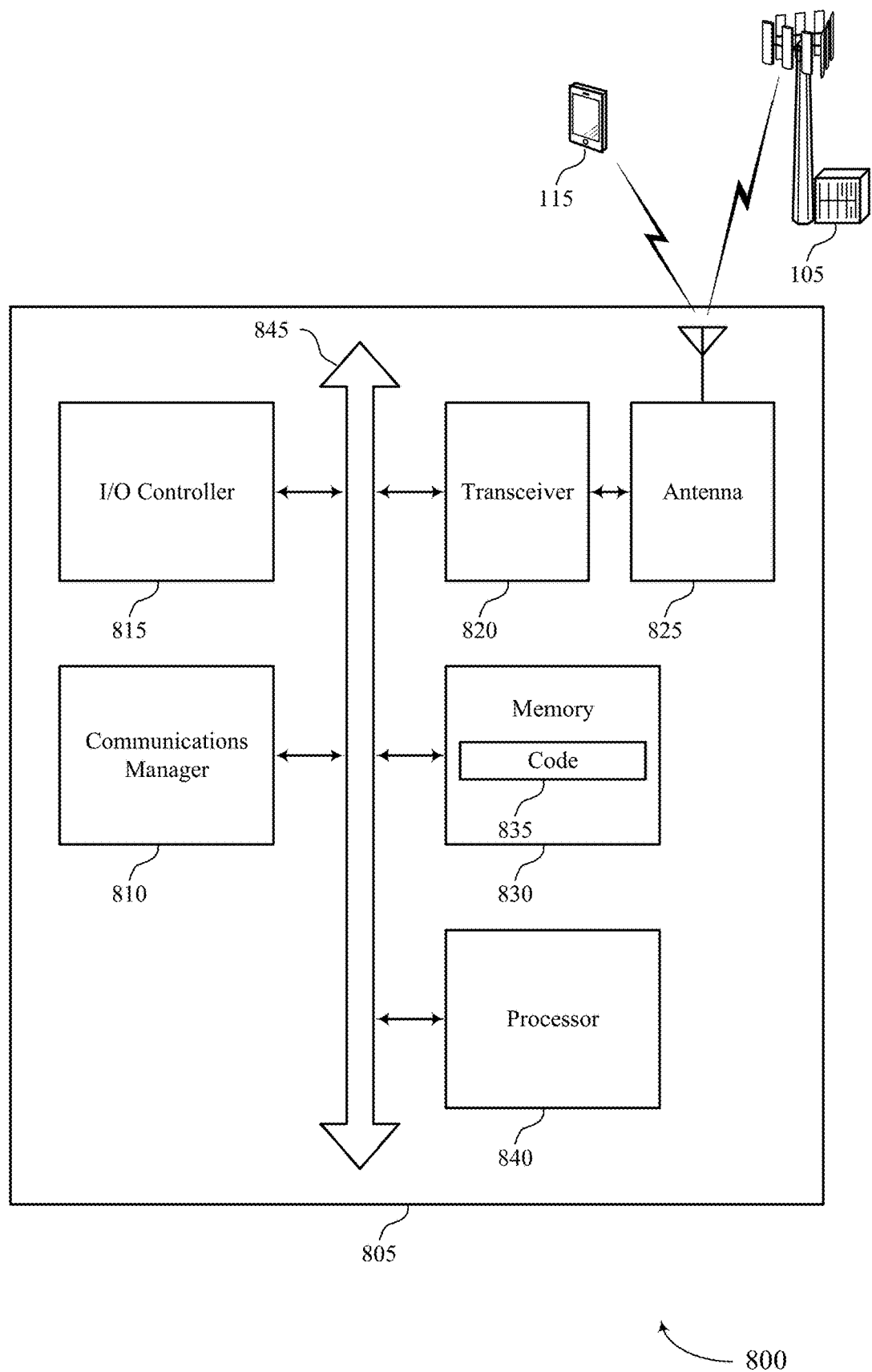
FIG. 8 shows a diagram of a system including a device that supports aspects of the present disclosure.

FIG. 8 shows a diagram of a system 800 including a device 805 that supports aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a connection with a base station via a first beamformed transmission beam, determine a timing difference between the first beamformed transmission beam and a second beamformed transmission beam, adjust an uplink timing for communications via the second beamformed transmission beam based on the timing difference, and switch the connection with the base station from the first beamformed transmission beam to the second beamformed transmission beam.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink timing adjustment in beamformed wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
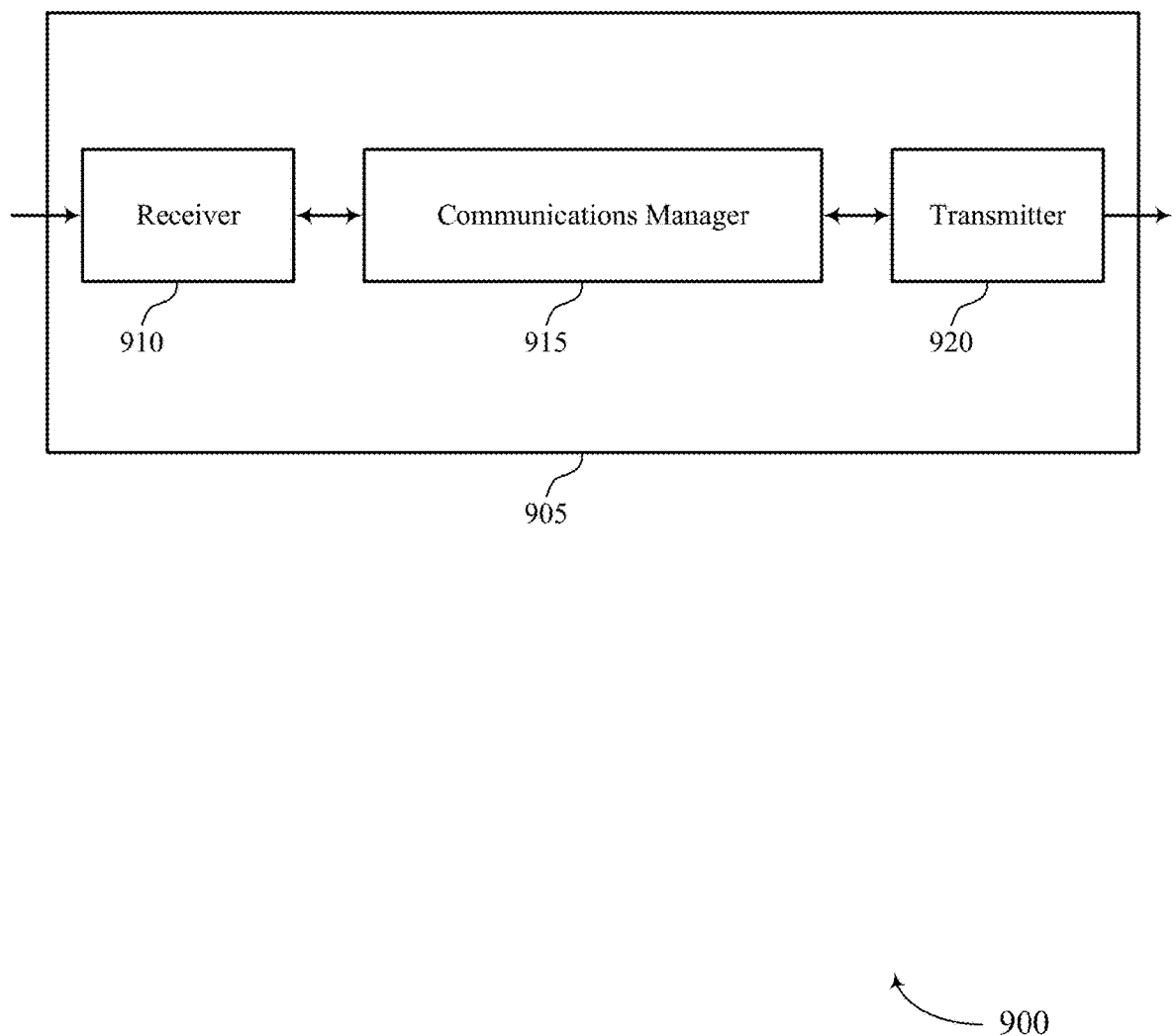
FIGS. 9 and 10 show block diagrams of devices that support aspects of the present disclosure.

FIG. 9 shows a block diagram 900 of a device 905 that supports aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink timing adjustment in beamformed wireless communications). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a connection with a UE via a first beamformed transmission beam, configure the UE to determine a timing difference between the first beamformed transmission beam and a second beamformed transmission beam, and switch the connection with the UE from the first beamformed transmission beam to the second beamformed transmission beam; and, where the UE adjusts an uplink timing for communications via the second beamformed transmission beam based on the timing difference. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
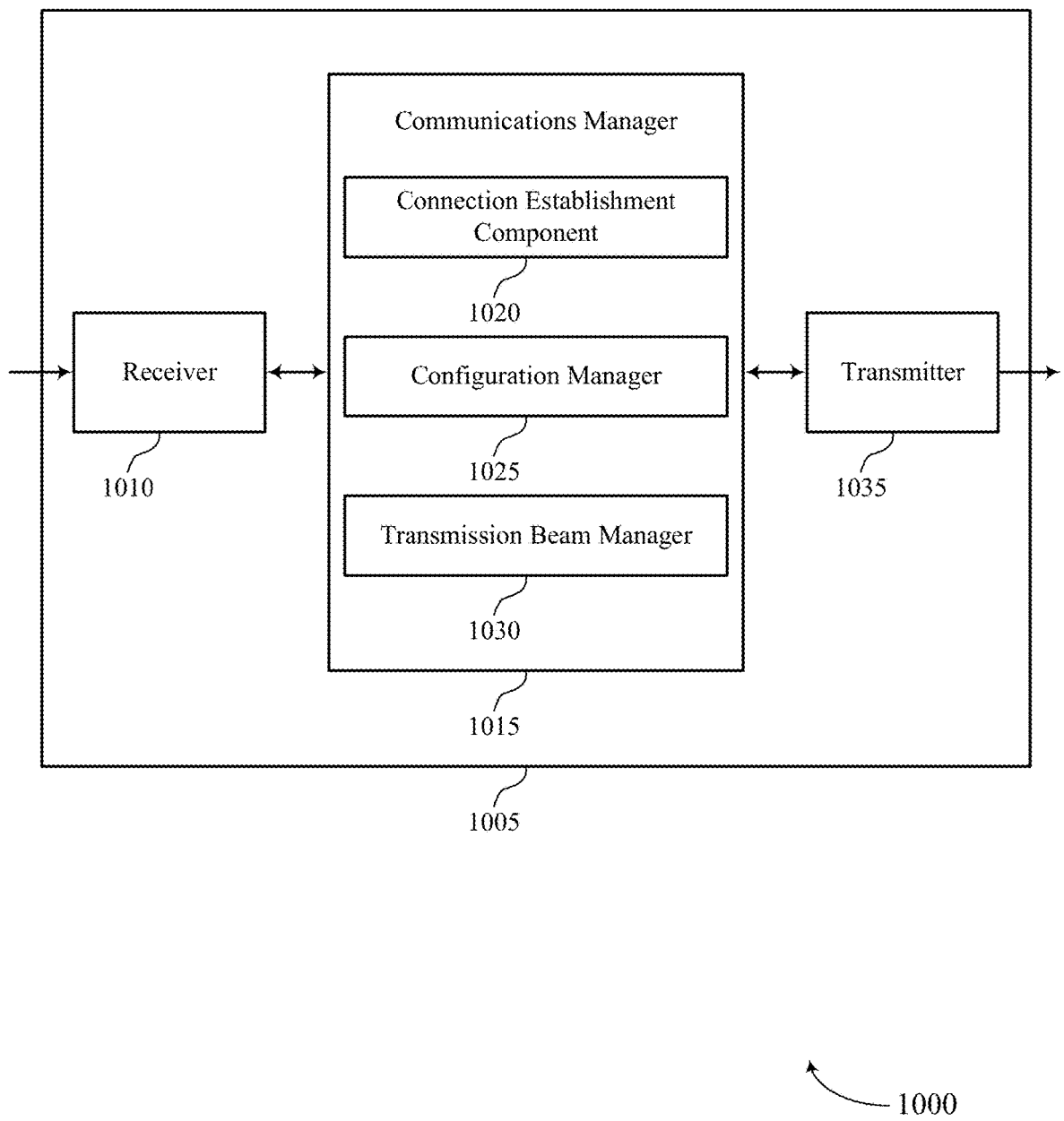

FIG. 10 shows a block diagram 1000 of a device 1005 that supports aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink timing adjustment in beamformed wireless communications). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment component 1020, a configuration manager 1025, and a transmission beam manager 1030. The communications manager 1015 may be an example of aspects of the communications manager 1210 described herein.

The connection establishment component 1020 may establish a connection with a UE via a first beamformed transmission beam.

The configuration manager 1025 may configure the UE to determine a timing difference between the first beamformed transmission beam and a second beamformed transmission beam.

The transmission beam manager 1030 may switch the connection with the UE from the first beamformed transmission beam to the second beamformed transmission beam; and, where the UE adjusts an uplink timing for communications via the second beamformed transmission beam based on the timing difference.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
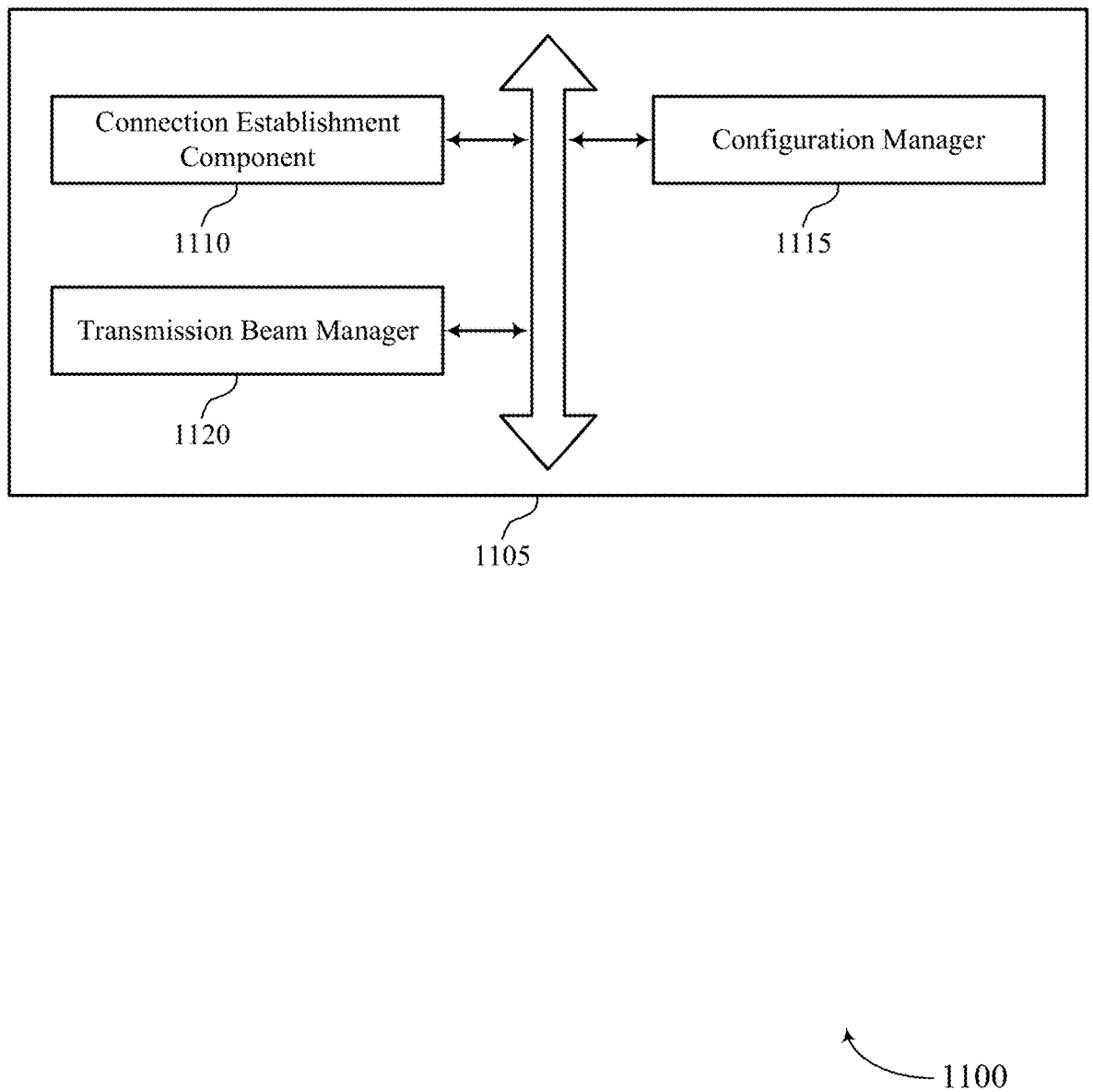
FIG. 11 shows a block diagram of a communications manager that supports aspects of the present disclosure.

FIG. 11 shows a block diagram 1100 of a communications manager 1105 that supports aspects of the present disclosure. The communications manager 1105 may be an example of aspects of a communications manager 915, a communications manager 1015, or a communications manager 1210 described herein. The communications manager 1105 may include a connection establishment component 1110, a configuration manager 1115, and a transmission beam manager 1120. Each of these modules may communicate, directly or indirectly, with one another (e.g., via one or more buses).

The connection establishment component 1110 may establish a connection with a UE via a first beamformed transmission beam. In some cases, two or more BPLs may be established, and the UE and base station may switch between established BPLs without performing a separate RRC connection establishment.

The configuration manager 1115 may configure the UE to determine a timing difference between the first beamformed transmission beam and a second beamformed transmission beam. In some cases, the first beamformed transmission beam may be a LOS beam, and the second beamformed transmission beam may be a non-LOS beam.

The transmission beam manager 1120 may switch the connection with the UE from the first beamformed transmission beam to the second beamformed transmission beam; and, where the UE adjusts an uplink timing for communications via the second beamformed transmission beam based on the timing difference.

Figure 12:
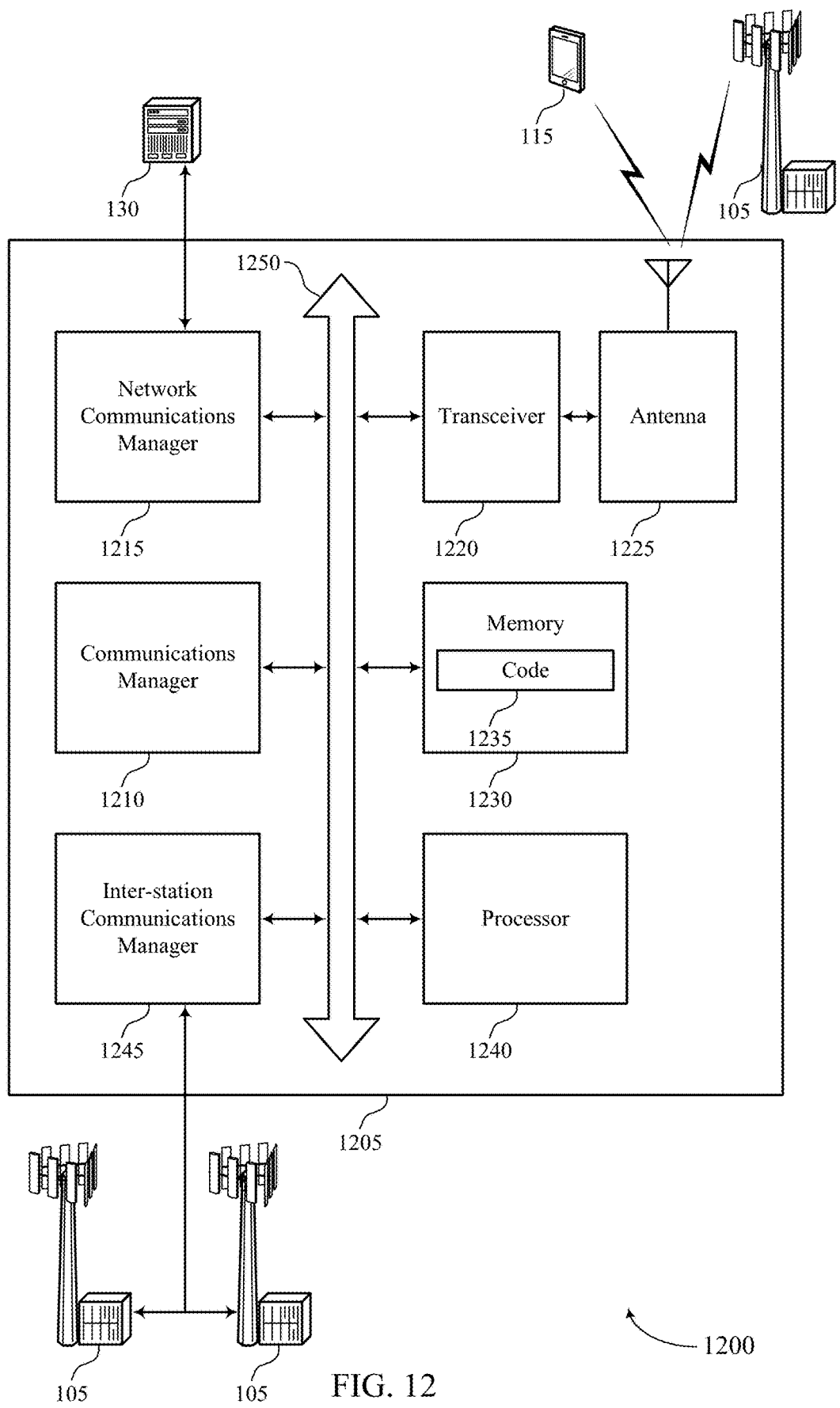
FIG. 12 shows a diagram of a system including a device that supports aspects of the present disclosure.

FIG. 12 shows a diagram of a system 1200 including a device 1205 that supports aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a connection with a UE via a first beamformed transmission beam, configure the UE to determine a timing difference between the first beamformed transmission beam and a second beamformed transmission beam, and switch the connection with the UE from the first beamformed transmission beam to the second beamformed transmission beam; and, where the UE adjusts an uplink timing for communications via the second beamformed transmission beam based on the timing difference.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device to perform various functions (e.g., functions or tasks supporting uplink timing adjustment in beamformed wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
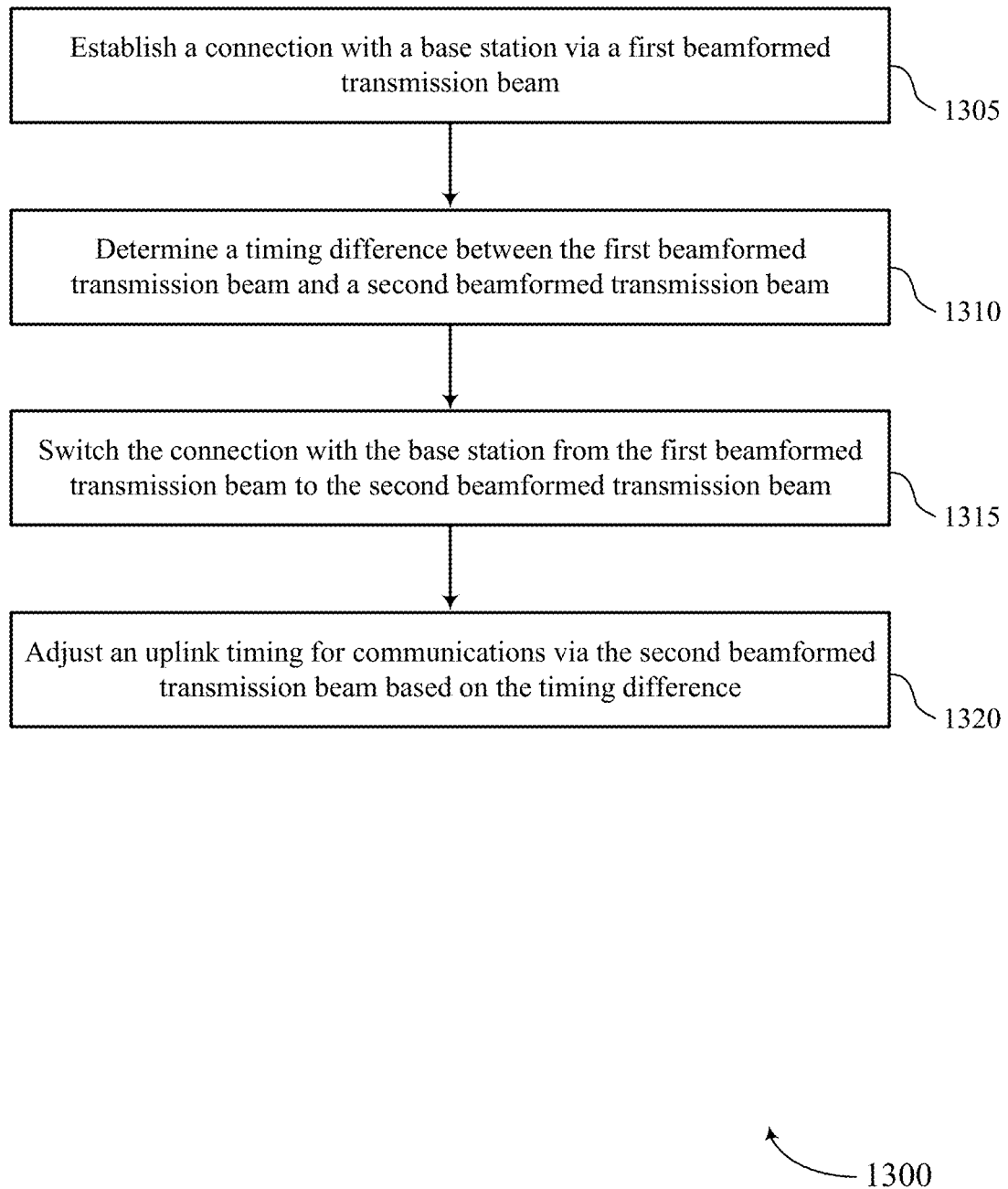
FIGS. 13 through 15 show flowcharts illustrating methods that support of the present disclosure.

FIG. 13 shows a flowchart illustrating a method 1300 that supports aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may establish a connection with a base station via a first beamformed transmission beam. The operations of 1305 may be performed according to the methods described herein. In some examples, aspects of the operations of 1305 may be performed by a connection establishment component as described with reference to FIGS. 5 through 8.

At 1310, the UE may determine a timing difference between the first beamformed transmission beam and a second beamformed transmission beam. The operations of 1310 may be performed according to the methods described herein. In some examples, aspects of the operations of 1310 may be performed by an uplink timing manager as described with reference to FIGS. 5 through 8. In some cases, the UE may receive a first reference signal via a first downlink beam that is quasi-co-located (QCL) with the first beamformed transmission beam, and a second reference signal via a second downlink beam that is QCL with the second beamformed transmission beam, and may determine the timing difference between a first reception time of the first reference signal and a second reception time of the second reference signal. In some cases, the first reference signal and the second reference signal include one or more of a synchronization signal received in a synchronization signal block (SSB), a tracking reference signal (TRS), a channel state information reference signal (CSI-RS), a phase tracking reference signal (PTRS), of any combination thereof.

At 1315, the UE may switch the connection with the base station from the first beamformed transmission beam to the second beamformed transmission beam. The operations of 1315 may be performed according to the methods described herein. In some examples, aspects of the operations of 1315 may be performed by a transmission beam manager as described with reference to FIGS. 5 through 8.

At 1320, the UE may adjust an uplink timing for communications via the second beamformed transmission beam based on the timing difference. The operations of 1320 may be performed according to the methods described herein. In some examples, aspects of the operations of 1320 may be performed by an uplink timing manager as described with reference to FIGS. 5 through 8. In some cases, the adjusting the uplink timing includes autonomously adjusting the uplink timing prior to an uplink transmission via the second beamformed transmission beam. In some cases, the uplink timing is adjusted based on the timing difference irrespective of a magnitude of the timing difference. In some cases, the first beamformed transmission beam is a line-of-sight (LOS) beam and the second beamformed transmission beam is a non-LOS beam.

Figure 14:
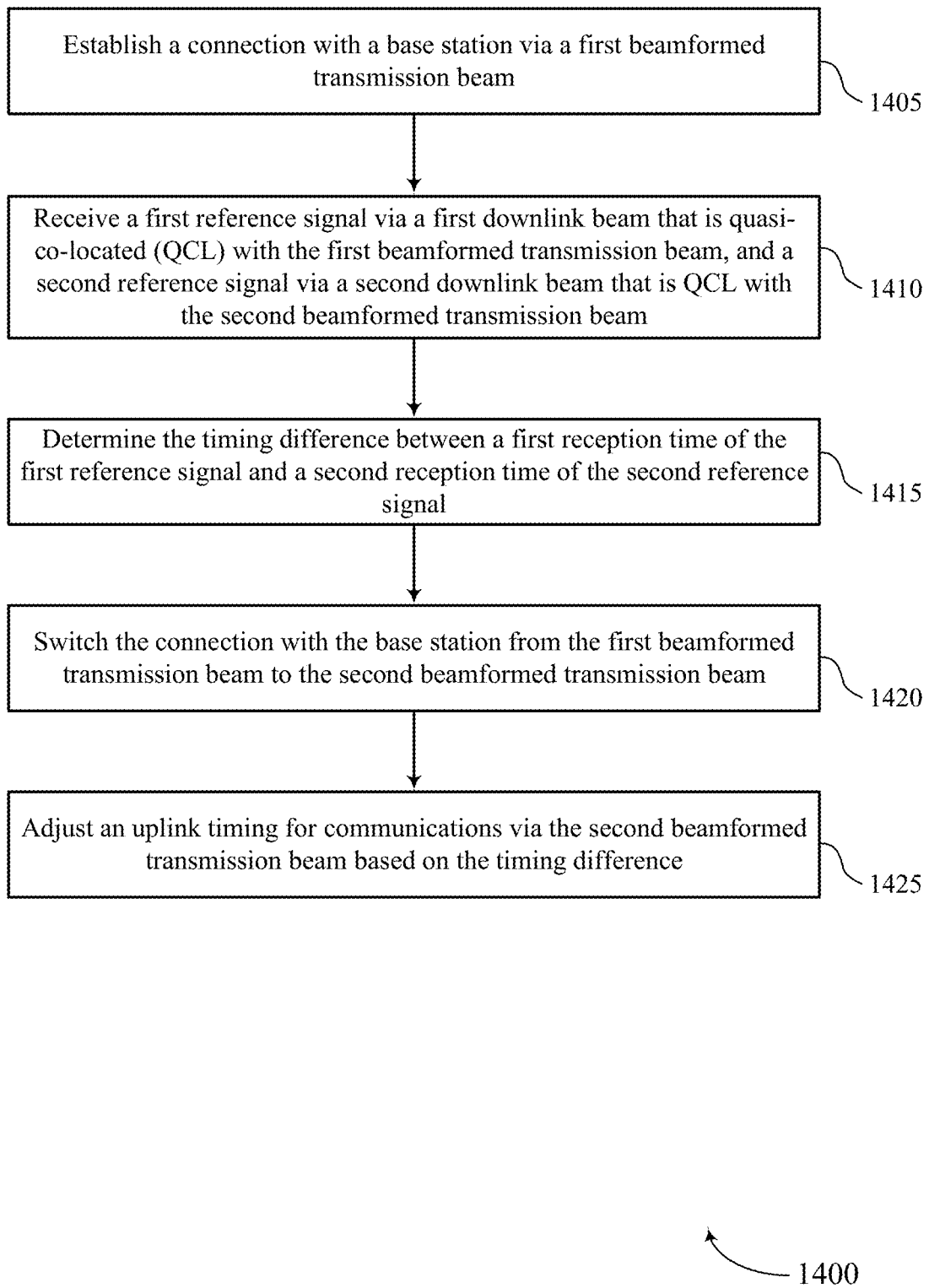

FIG. 14 shows a flowchart illustrating a method 1400 that supports aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may establish a connection with a base station via a first beamformed transmission beam. The operations of 1405 may be performed according to the methods described herein. In some examples, aspects of the operations of 1405 may be performed by a connection establishment component as described with reference to FIGS. 5 through 8.

At 1410, the UE may receive a first reference signal via a first downlink beam that is quasi-co-located (QCL) with the first beamformed transmission beam, and a second reference signal via a second downlink beam that is QCL with the second beamformed transmission beam. The operations of 1410 may be performed according to the methods described herein. In some examples, aspects of the operations of 1410 may be performed by an uplink timing manager as described with reference to FIGS. 5 through 8.

At 1415, the UE may determine the timing difference between a first reception time of the first reference signal and a second reception time of the second reference signal. The operations of 1415 may be performed according to the methods described herein. In some examples, aspects of the operations of 1415 may be performed by an uplink timing manager as described with reference to FIGS. 5 through 8.

At 1420, the UE may switch the connection with the base station from the first beamformed transmission beam to the second beamformed transmission beam. The operations of 1420 may be performed according to the methods described herein. In some examples, aspects of the operations of 1420 may be performed by a transmission beam manager as described with reference to FIGS. 5 through 8.

At 1425, the UE may adjust an uplink timing for communications via the second beamformed transmission beam based on the timing difference. The operations of 1425 may be performed according to the methods described herein. In some examples, aspects of the operations of 1425 may be performed by an uplink timing manager as described with reference to FIGS. 5 through 8.

Figure 15:
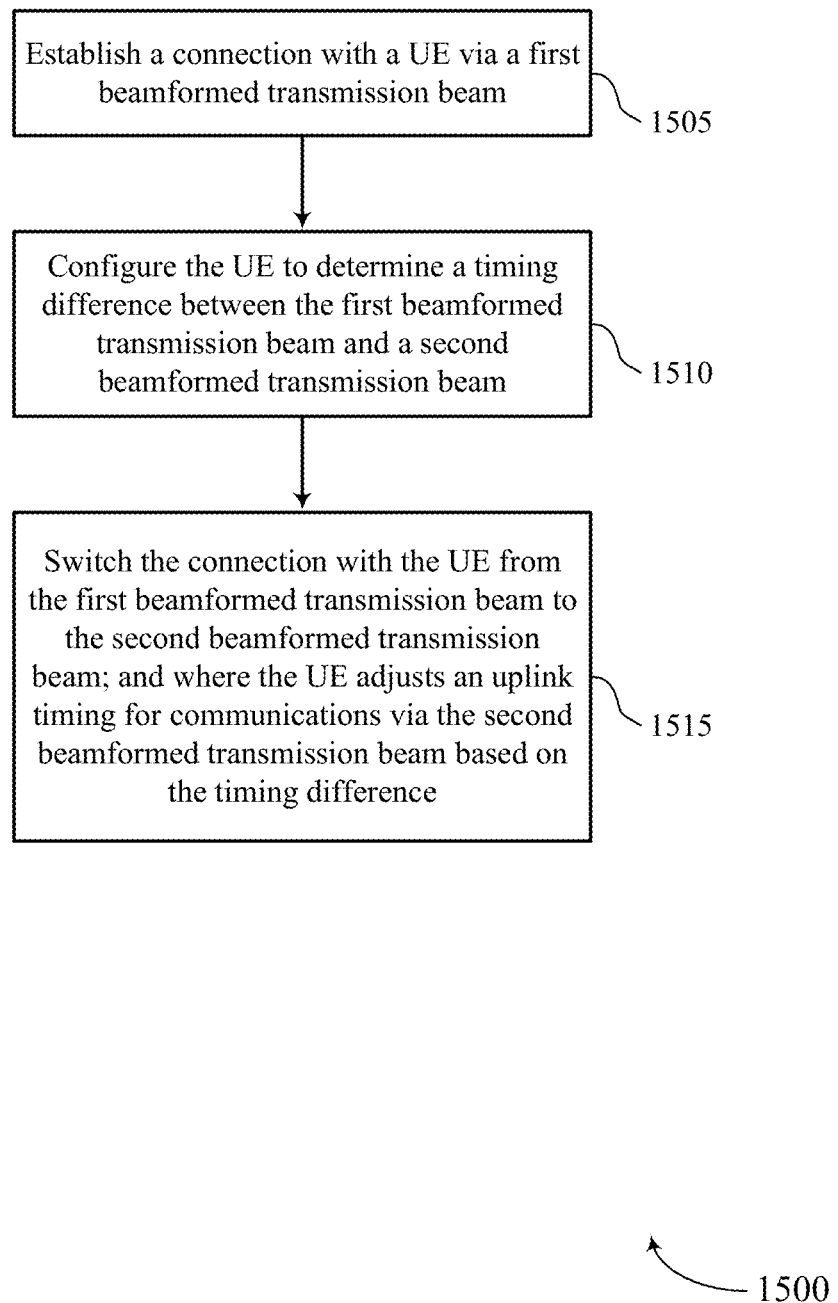

FIG. 15 shows a flowchart illustrating a method 1500 that supports aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may establish a connection with a UE via a first beamformed transmission beam. The operations of 1505 may be performed according to the methods described herein. In some examples, aspects of the operations of 1505 may be performed by a connection establishment component as described with reference to FIGS. 9 through 12.

At 1510, the base station may configure the UE to determine a timing difference between the first beamformed transmission beam and a second beamformed transmission beam. The operations of 1510 may be performed according to the methods described herein. In some examples, aspects of the operations of 1510 may be performed by a configuration manager as described with reference to FIGS. 9 through 12.

At 1515, the base station may switch the connection with the UE from the first beamformed transmission beam to the second beamformed transmission beam; and, where the UE adjusts an uplink timing for communications via the second beamformed transmission beam based on the timing difference. The operations of 1515 may be performed according to the methods described herein. In some examples, aspects of the operations of 1515 may be performed by a transmission beam manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

establishing a connection with a base station via a first beamformed transmission beam;

determining a timing difference between receipt of a first signal via the first beamformed transmission beam and receipt of a second signal via a second beamformed transmission beam;

switching the connection with the base station from the first beamformed transmission beam to the second beamformed transmission beam; and adjusting an uplink timing for communications via the second beamformed transmission beam based at least in part on the timing difference.

2. The method of claim 1, wherein the adjusting the uplink timing further comprises:

comparing the timing difference to one or more threshold values; and adjusting the uplink timing based at least in part on the comparing.

3. The method of claim 1, wherein the uplink timing is adjusted based on the timing difference irrespective of a magnitude of the timing difference.

4. The method of claim 1, wherein the adjusting the uplink timing comprises autonomously adjusting the uplink timing prior to an uplink transmission via the second beamformed transmission beam.

5. The method of claim 1, wherein the first beamformed transmission beam and the second beamformed transmission beam are uplink transmission beams, and wherein the determining the timing difference comprises:

receiving the first signal that is a first reference signal via a first downlink beam that is quasi-co-located (QCL) with the first beamformed transmission beam, and the second signal that is a second reference signal via a second downlink beam that is QCL with the second beamformed transmission beam; and determining the timing difference between a first reception time of the first reference signal and a second reception time of the second reference signal.

6. The method of claim 5, wherein the first reference signal and the second reference signal comprise one or more of a synchronization signal received in a synchronization signal block (SSB), a tracking reference signal (TRS), a channel state information reference signal (CSI-RS), a phase tracking reference signal (PTRS), or any combination thereof.

7. The method of claim 1, wherein the establishing the connection further comprises:

establishing the connection via the first beamformed transmission beam for communications of a first uplink channel and a third beamformed transmission beam for communications of a second uplink channel, and wherein an uplink timing associated with the third beamformed transmission beam is maintained independently of the switching between the first beamformed transmission beam and the second beamformed transmission beam.

8. The method of claim 7, wherein the first beamformed transmission beam is quasi-co-located (QCL) with a first synchronization signal block (SSB) transmitted via a first downlink transmission beam and the third beamformed transmission beam is QCL with a second SSB transmitted via a second downlink transmission beam.

9. The method of claim 7, wherein the second beamformed transmission beam is used for uplink transmissions in a first set of uplink symbols within an uplink slot, and the third beamformed transmission beam is used for uplink transmissions in a second set of uplink symbols within the uplink slot, and wherein an uplink timing for the first set of uplink symbols within the uplink slot is different than an uplink timing for the second set of uplink symbols within the uplink slot.

10. The method of claim 7, wherein:

the first beamformed transmission beam and the second beamformed transmission beam are used to transmit physical uplink control channel (PUCCH) information, and the third beamformed transmission beam is used to transmit physical uplink shared channel (PUSCH) information, or the first beamformed transmission beam and the second beamformed transmission beam are used to transmit PUSCH information, and the third beamformed transmission beam is used to transmit PUCCH information.

11. The method of claim 1, wherein the first beamformed transmission beam is a line-of-sight (LOS) beam and the second beamformed transmission beam is a non-LOS beam.

12. An apparatus for wireless communications at a user equipment (UE), comprising:

a processor, memory in electronic communication with the processor; and instructions stored in the memory and executable by the processor to cause the apparatus to:

establish a connection with a base station via a first beamformed transmission beam;

determine a timing difference between receipt of a first signal via the first beamformed transmission beam and receipt of a second signal via a second beamformed transmission beam;

switch the connection with the base station from the first beamformed transmission beam to the second beamformed transmission beam; and adjust an uplink timing for communications via the second beamformed transmission beam based at least in part on the timing difference.

13. The apparatus of claim 12, wherein the uplink timing is adjusted based on the timing difference irrespective of a magnitude of the timing difference.

14. The apparatus of claim 12, wherein the adjusting the uplink timing comprises autonomously adjusting the uplink timing prior to an uplink transmission via the second beamformed transmission beam.

15. The apparatus of claim 12, further comprising a receiver, wherein the first beamformed transmission beam and the second beamformed transmission beam are uplink transmission beams, and wherein the instructions are further executable by the processor to cause the apparatus to:

receive, via the receiver, the first signal that is a first reference signal via a first downlink beam that is quasi-co-located (QCL) with the first beamformed transmission beam, and the second signal that is a second reference signal via a second downlink beam that is QCL with the second beamformed transmission beam; and determine the timing difference between a first reception time of the first reference signal and a second reception time of the second reference signal.

16. The apparatus of claim 15, wherein the first reference signal and the second reference signal comprise one or more of a synchronization signal received in a synchronization signal block (SSB), a tracking reference signal (TRS), a channel state information reference signal (CSI-RS), a phase tracking reference signal (PTRS), of any combination thereof.

17. The apparatus of claim 12, wherein the instructions are further executable by the processor to cause the apparatus to:
 establish the connection via the first beamformed transmission beam for communications of a first uplink channel and a third beamformed transmission beam for communications of a second uplink channel, and wherein an uplink timing associated with the third beamformed transmission beam is maintained independently of the switching between the first beamformed transmission beam and the second beamformed transmission beam.

18. The apparatus of claim 17, wherein the first beamformed transmission beam is quasi-co-located (QCL) with a first synchronization signal block (SSB) transmitted via a first downlink transmission beam and the third beamformed transmission beam is QCL with a second SSB transmitted via a second downlink transmission beam.

19. The apparatus of claim 17, wherein the second beamformed transmission beam is used for uplink transmissions in a first set of uplink symbols within an uplink slot, and the third beamformed transmission beam is used for uplink transmissions in a second set of uplink symbols within the uplink slot, and wherein an uplink timing for the first set of uplink symbols within the uplink slot is different than an uplink timing for the second set of uplink symbols within the uplink slot.

20. The apparatus of claim 17, wherein:
 the first beamformed transmission beam and the second beamformed transmission beam are used to transmit physical uplink control channel (PUCCH) information, and the third beamformed transmission beam is used to transmit physical uplink shared channel (PUSCH) information, or
 the first beamformed transmission beam and the second beamformed transmission beam are used to transmit PUSCH information, and the third beamformed transmission beam is used to transmit PUCCH information.

21. The apparatus of claim 12, wherein the uplink timing is adjusted based at least in part on a comparison between the timing difference and one or more threshold values.

22. The apparatus of claim 12, wherein the first beamformed transmission beam is a line-of-sight (LOS) beam and the second beamformed transmission beam is a non-LOS beam.

23. An apparatus for wireless communications at a user equipment (UE), comprising:
 means for establishing a connection with a base station via a first beamformed transmission beam;
 means for determining a timing difference between receipt of a first signal via the first beamformed transmission beam and receipt of a second signal via a second beamformed transmission beam;
 means for switching the connection with the base station from the first beamformed transmission beam to the second beamformed transmission beam; and
 means for adjusting an uplink timing for communications via the second beamformed transmission beam based at least in part on the timing difference.

24. The apparatus of claim 23, wherein the uplink timing is adjusted based on the timing difference irrespective of a magnitude of the timing difference.

25. The apparatus of claim 23, wherein the adjusting the uplink timing comprises autonomously adjusting the uplink timing prior to an uplink transmission via the second beamformed transmission beam.

26. The apparatus of claim 23, wherein the first beamformed transmission beam and the second beamformed transmission beam are uplink transmission beams, and wherein the apparatus further comprises:
 means for receiving the first signal that is a first reference signal via a first downlink beam that is quasi-co-located (QCL) with the first beamformed transmission beam, and the second signal that is a second reference signal via a second downlink beam that is QCL with the second beamformed transmission beam; and
 means for determining the timing difference between a first reception time of the first reference signal and a second reception time of the second reference signal.

27. The apparatus of claim 26, wherein the first reference signal and the second reference signal comprise one or more of a synchronization signal received in a synchronization signal block (SSB), a tracking reference signal (TRS), a channel state information reference signal (CSI-RS), a phase tracking reference signal (PTRS), of any combination thereof.

28. The apparatus of claim 23, wherein the means for establishing the connection establishes the connection via the first beamformed transmission beam for communications of a first uplink channel and a third beamformed transmission beam for communications of a second uplink channel, and wherein uplink timing associated with the third beamformed transmission beam is maintained independently of the switching between the first beamformed transmission beam and the second beamformed transmission beam.

29. The apparatus of claim 28, wherein the first beamformed transmission beam is quasi-co-located (QCL) with a first synchronization signal block (SSB) transmitted via a first downlink transmission beam and the third beamformed transmission beam is QCL with a second SSB transmitted via a second downlink transmission beam.

30. A non-transitory computer-readable medium storing code for wireless communications at a user equipment (UE), the code comprising instructions executable by a processor to:
 establish a connection with a base station via a first beamformed transmission beam;
 determine a timing difference between receipt of a first signal via the first beamformed transmission beam and receipt of a second signal via a second beamformed transmission beam;
 switch the connection with the base station from the first beamformed transmission beam to the second beamformed transmission beam; and
 adjust an uplink timing for communications via the second beamformed transmission beam based at least in part on the timing difference.

* * * * *